No. 616,035.　　　　　　　　　　　　　　　　　Patented Dec. 13, 1898.
J. L. THOMA.
ELECTRIC MOTOR.
(Application filed June 20, 1898.)

(No Model.)　　　　　　　　　　　　　　　　　　　　3 Sheets—Sheet 1.

Witnesses:　　　　　　　　　　　　　　　　　Inventor:
　　　　　　　　　　　　　　　　　　　　　Julius L. Thoma
M. R. Remley
　　　　　　　　　　　　　　　By Higdon, Fischer & Thorpe
F. S. Thrasher　　　　　　　　　　　　　　　　　　attys.

No. 616,035. Patented Dec. 13, 1898.
J. L. THOMA.
ELECTRIC MOTOR.
(Application filed June 20, 1898.)
(No Model.) 3 Sheets—Sheet 2.

Witnesses:
M. R. Remley.
F. S. Thrasher.

Inventor:
Julius L. Thoma
By Higdon, Fischer + Thorpe
attys.

No. 616,035. Patented Dec. 13, 1898.
J. L. THOMA.
ELECTRIC MOTOR.
(Application filed June 20, 1898.)
(No Model.) 3 Sheets—Sheet 3.

Witnesses:
M. P. Remley,
F. S. Thrasher,

Inventor:
Julius L. Thoma
By Higdon, Fischer & Thorpe
Attys.

United States Patent Office.

JULIUS L. THOMA, OF KANSAS CITY, MISSOURI, ASSIGNOR OF SEVENTEEN-TWENTIETHS TO AGNUS M. L. MILLER, CRESCENT P. BROD, LOUISE V. PANHOFF, AND JOHN POTZNER, OF SAME PLACE.

ELECTRIC MOTOR.

SPECIFICATION forming part of Letters Patent No. 616,035, dated December 13, 1898.

Application filed June 20, 1898. Serial No. 683,935. (No model.)

*To all whom it may concern:*

Be it known that I, JULIUS L. THOMA, of Kansas City, Jackson county, Missouri, have invented certain new and useful Improvements in Electric Motors, of which the following is a specification.

My invention relates to electric motors; and it consists in certain novel and peculiar features of construction and combinations of parts, which will be hereinafter described and claimed.

The object of the invention is to produce an electric motor which is of extremely simple, strong, and durable construction and which can be manufactured at a comparatively small cost.

In order that the invention may be fully understood, I will proceed to describe it with reference to the accompanying drawings, in which—

Figure 1:
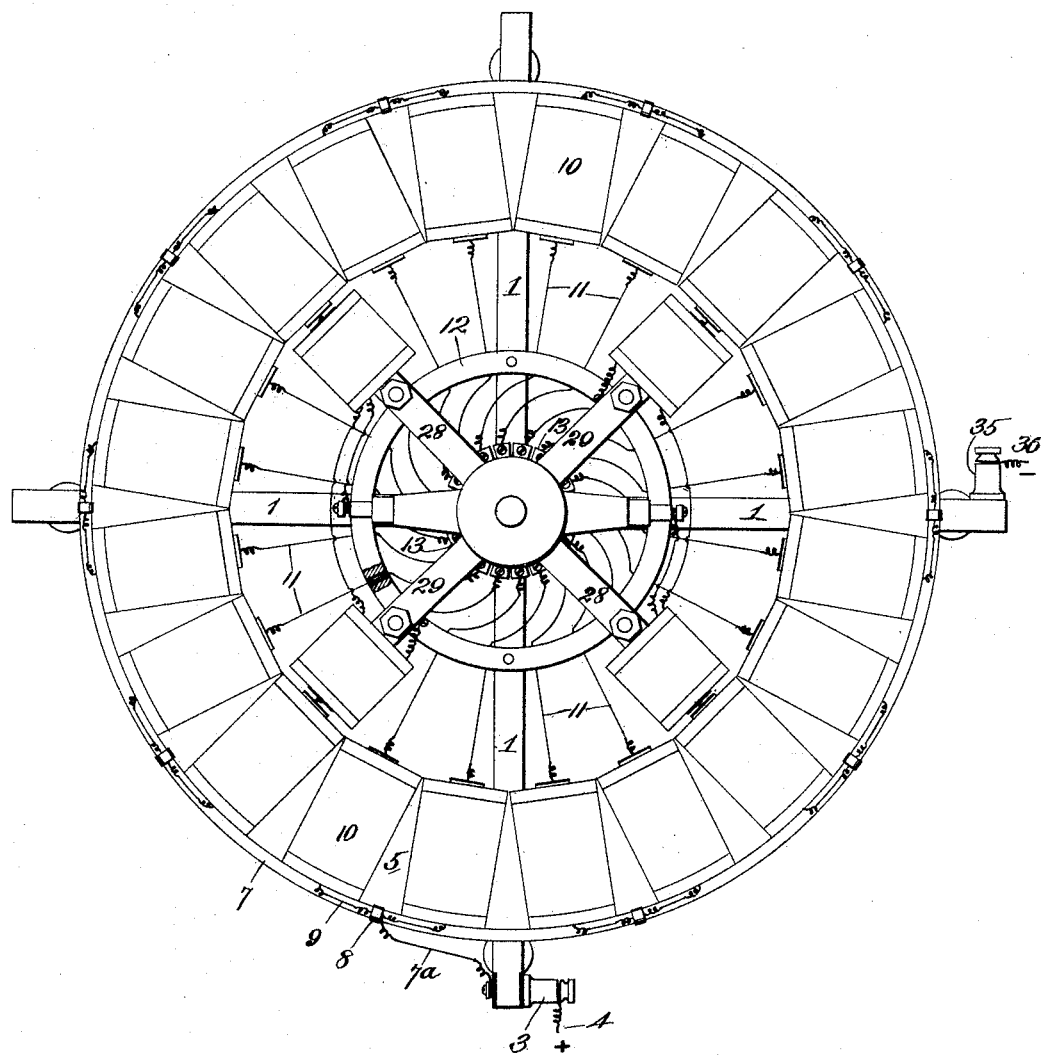
Figure 2:
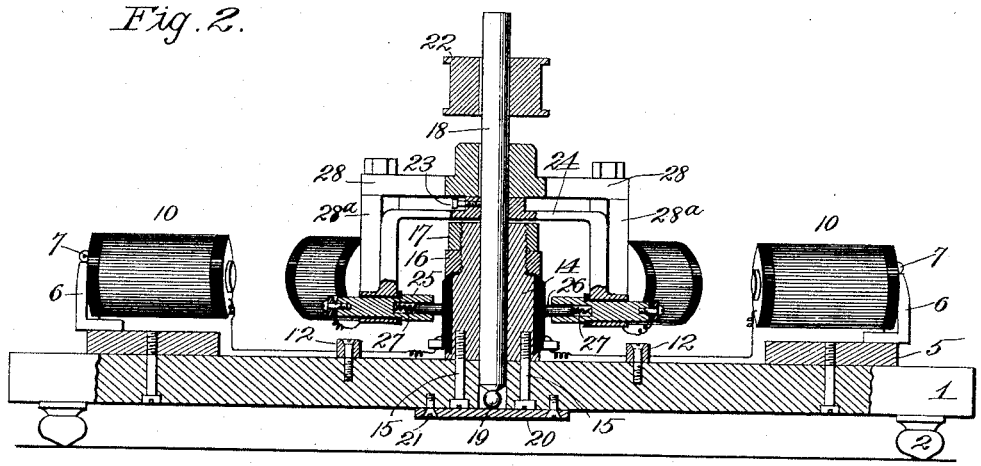
Figure 3:
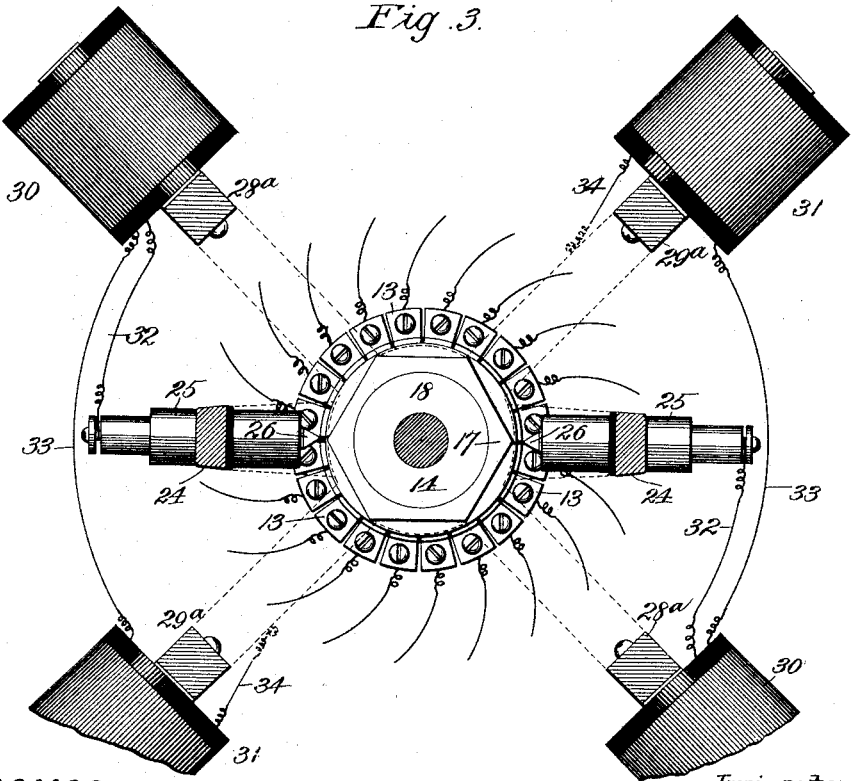
Figure 4:
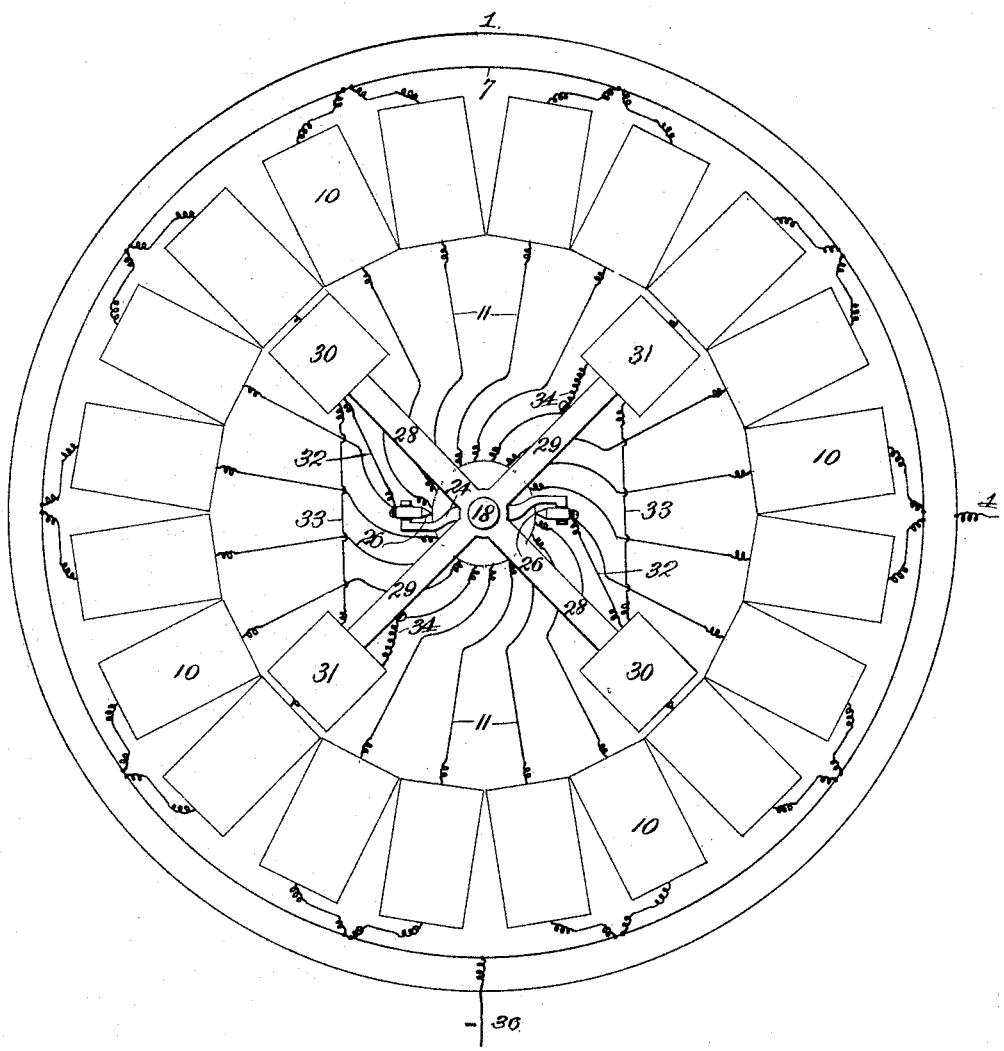

Figure 1 represents a top plan view of an electric motor embodying my invention. Fig. 2 is a vertical central section of the same. Fig. 3 is a top plan view of the armature and the commutator in order to more clearly disclose their relation. Fig. 4 is a diagrammatic view to illustrate clearly the course of the circuit.

In the said drawings the motor-base is constructed in the form of a cross 1 and is mounted upon supports or legs 2. The base is provided at a suitable point with an arm carrying an insulated binding-post 3, to which is connected one wire 4—for instance, the positive wire—of any suitable source of electric energy.

5 designates a ring or circular plate bolted down upon said frame and provided with a plurality of brackets 6, which support a circular insulated feed-wire or distributer 7, said feed-wire or distributer being electrically connected by wire or conductor 7ª to binding-post 3. The feed-wire or distributer carries at suitable intervals and in electrical contact therewith the contact-clamps 8, from which lead the wires or conductors 9 to the electromagnets 10, mounted upon said brackets, said brackets being arranged radially of the center of the frame.

11 designates wires which extend from said magnets inward through the inner concentric ring 12, bolted to the frame, said wires being insulated from said ring in any suitable or preferred manner. The inner ends of said wires are electrically connected to the commutator, the strips 13 of the same being insulated from each other and from the vertical bearing-sleeve 14, secured by bolts 15 to the frame of the machine. To secure said strips in place, I preferably employ a threaded collar or nut 16 and a lock-nut 17, mounted upon said bearing-sleeve.

18 designates a vertical armature-shaft journaled in said bearing-sleeve and having its conical lower end resting upon the bearing-ball 19, held in position by means of the cap-plate 20, bolted, as shown at 21, to the under side of the frame and adapted not only to support the weight of the armature, but also to prevent the withdrawal of bolts 15. Keyed upon the upper end of said shaft is a belt-wheel 22, and secured by set-screw upon the shaft is an inverted-U frame 24, carrying at its lower end and insulated therefrom the hollow pins 25, from which project the contact brushes or carbons 26 for engagement with the contact and insulation strips of the commutator, said carbons being in electrical contact with the two opposite strips of the commutator at the same time, and to compensate for wear of said carbons expansive springs 27, carried by said pins, hold the carbons pressed toward the commutator with a yielding pressure.

The armature is constructed as follows: 28 and 29 designate integrally-formed but intersecting arms which are keyed at their intersection-point upon the shaft 18, above the U-shaped frame 24, and depending from and preferably bolted to the outer ends of said arms are subarms 28ª and 29ª, respectively, the former carrying the coils 30 and the latter the coils 31. The coils 30 are electrically connected by wires or conductors 32 with the ends of the adjacent hollow pins 25, as shown, and by means of wires or conductors 33 with the adjacent coils 31. Coils 31 are in turn connected by wires or conductors 34 to the arms 29ª of the frame, which are electrically connected by the shaft 18 and the subjacent parts to the base-frame 1, as will be readily understood from reference to Fig. 2, and electrically connected to the base by means of the binding-post 35, mounted upon an arm of the base, is the return-wire 36, leading to the source of electric energy, hereinbefore referred to.

When the motor is in operation, the current is as follows: through wire 4, binding-post 3, wire 7ª to feed-wire 7, from the latter to the contact-clamps 8, thence through the wires 9, connected to the electromagnets 10, which are connected to the commutator-strips at that instant engaged by the brushes 26, which two magnets are of course energized. The current passes from said commutator-strips, by way of the brushes or carbons, to the pins 25, and thence to the armature-coils 30, which are also energized, and likewise the armature-coils 31, connected to coils 30, these several coils by their position having their poles of opposite polarity to the opposing poles of the magnets 10—that is to say, if the inner ends of magnets 10 present their positive poles the adjacent outer ends of coils 30 and 31 present their negative poles. The current passes from coils 31, through wires 34, to the arm 29 of the armature-frame, thence through shaft 18 and bearing-sleeve 14 to the base-frame 1, and from the latter, through binding-post 35 and wire 36, back to the opposite pole of the source of electric energy. By this arrangement it is obvious that all of the coils of the armature are energized except at such times as the brushes pass over the insulation-strips of the commutator, that only the two magnets which are just in advance of two of the diametrically opposite coils of the armature are energized at a time, the arrangement being such that the instant said coils come squarely opposite said magnets the latter are deënergized and the next two magnets in advance of said coils are energized. In order that at the moment the former magnets would by the attraction between their poles and the opposite poles of the coils tend to retard the movement of the armature, their influence is destroyed and an influence attractive to the coils established just in advance. Consequently the armature is caused to revolve at an exceedingly high rate of speed.

Owing to the fact that only the two diametrically opposite magnets in advance of one pair—for example, coils 30—of coils are energized at the same instant as said coils it is obvious that the other pair of coils (coils 31) of the armature exert only about one-half the power of the pair (30) contiguous to and approaching said energized magnets—that is to say, as energized coils 31 approach the demagnetized magnets next in advance they are drawn or attracted toward said magnets with only about half the power that would be exerted if both the coils 31 and said demagnetized magnets were simultaneously energized, as occurs with respect to coils 30 and the contiguous magnets in advance thereof. In one case the coils 31 are pulling alone. In the other the coils 30 and a pair of energized magnets pull together. It will furthermore be noted by reference particularly to Fig. 4 that the armature-coils are demagnetized by contact of the brushes with the insulation-strips at the instant said coils come squarely opposite the magnets and that by the time the momentum of the armature carries its brushes in contact with the next commutator-strips in advance the coils have assumed such position with relation to the coils next in advance (a pair of which are energized at this time) that any slight attraction between said coils and the deënergized magnets just passed is more than counterbalanced by the attraction of the energized pair of coils 30 to the pair of energized magnets. Furthermore, the momentum of the armature is so great that the energized magnets in advance of the other pair of armature-coils are brought within the fields of said coils when the latter attain a position about half-way between said magnets and those which the coils have just passed. Consequently, assuming that the attraction between said energized pair 31 of coils and the magnets at opposite sides—that is, in front and rear—is equal, it is obvious that the momentum may easily carry said armature-coils past the "dead" or neutral point.

Having thus described the invention, what I claim as new, and desire to secure by Letters Patent, is—

1. An electric motor, comprising a circular series of magnets, a commutator arranged concentrically thereof and composed of a corresponding series of insulated strips, wires connecting said series of magnets and strips, a shaft suitably journaled, an armature mounted thereon and embodying a plurality of coils, a frame also mounted upon said shaft, brushes carried by but insulated from said frame and engaging said commutator, and electrically connected to an opposite pair of the armature-coils, electric conductors between said coils and the other armature-coils, conductors between the latter and the armature-frame, conductors connected to the frame, and conductors connected to said magnets, substantially as described.

2. An electric motor, comprising a frame, a circular series of electromagnets mounted thereon, in electrical connection with the source of energy, a commutator composed of a corresponding number of strips connected to said magnets, a shaft mounted in the frame centrally of the commutator and magnets, an armature-frame mounted upon said shaft and provided with a plurality of coils, a second frame also upon said shaft, brushes carried by and insulated from said frame and electrically connected to a pair of armature-coils located diametrically opposite each other, electrical connections between said coils and the remaining armature-coils, and a conductor electrically connected to the armature-frame and to the source of electric supply, substantially as described.

3. An electric motor, comprising a base-frame, a circular series of electromagnets mounted thereon, a cylindrical block mounted upon the center of the frame concentrically of said magnets, and provided with a commutator provided with strips equal in number to said magnets and electrically connected thereto, a shaft journaled in said block and base-frame, an armature mounted upon said shaft and consisting of a cross-frame having depending arms, a coil carried by each arm in the horizontal plane of the magnets; said coils being connected together in pairs, and contact-brushes to successively engage the commutator-strips, electrically-connected to a pair of diametrically opposite coils and adapted to engage successively the strips of the commutator; said brushes being so arranged that the coils of the armature shall be energized at the same instant that a pair of diametrically opposite magnets in advance of two of said coils is energized, and that said coils are demagnetized when squarely opposite any of said magnets, substantially as described.

4. An electric motor, comprising a base-frame having a central opening and a plate covering its lower end, a circular series of electromagnets concentrically surrounding said opening and supported above said frame, a vertical bearing bolted to said frame and provided with a registering opening and a commutator, a bearing-ball resting upon the plate at the bottom of the opening in the frame, a shaft journaled in said bearing-block and base and upon said ball, a U-shaped frame secured upon said shaft and carrying radially-arranged hollow pins insulated therefrom, and spring-actuated brushes for simultaneous engagement with the commutator, wires connecting said magnets with said commutator-strips, a cross-frame keyed upon said shaft and carrying armature-coils, connected together in pairs, and wires connecting said coils with said hollow pins, substantially as described.

In testimony whereof I affix my signature in the presence of two witnesses.

JULIUS L. THOMA.

Witnesses:
F. S. THRASHER,
M. R. REMLEY.